Jan. 4, 1944.   P. I. SCHULTZ   2,338,603
PRESSURE SUPPORTING MECHANISM
Original Filed Dec. 4, 1937   2 Sheets-Sheet 1
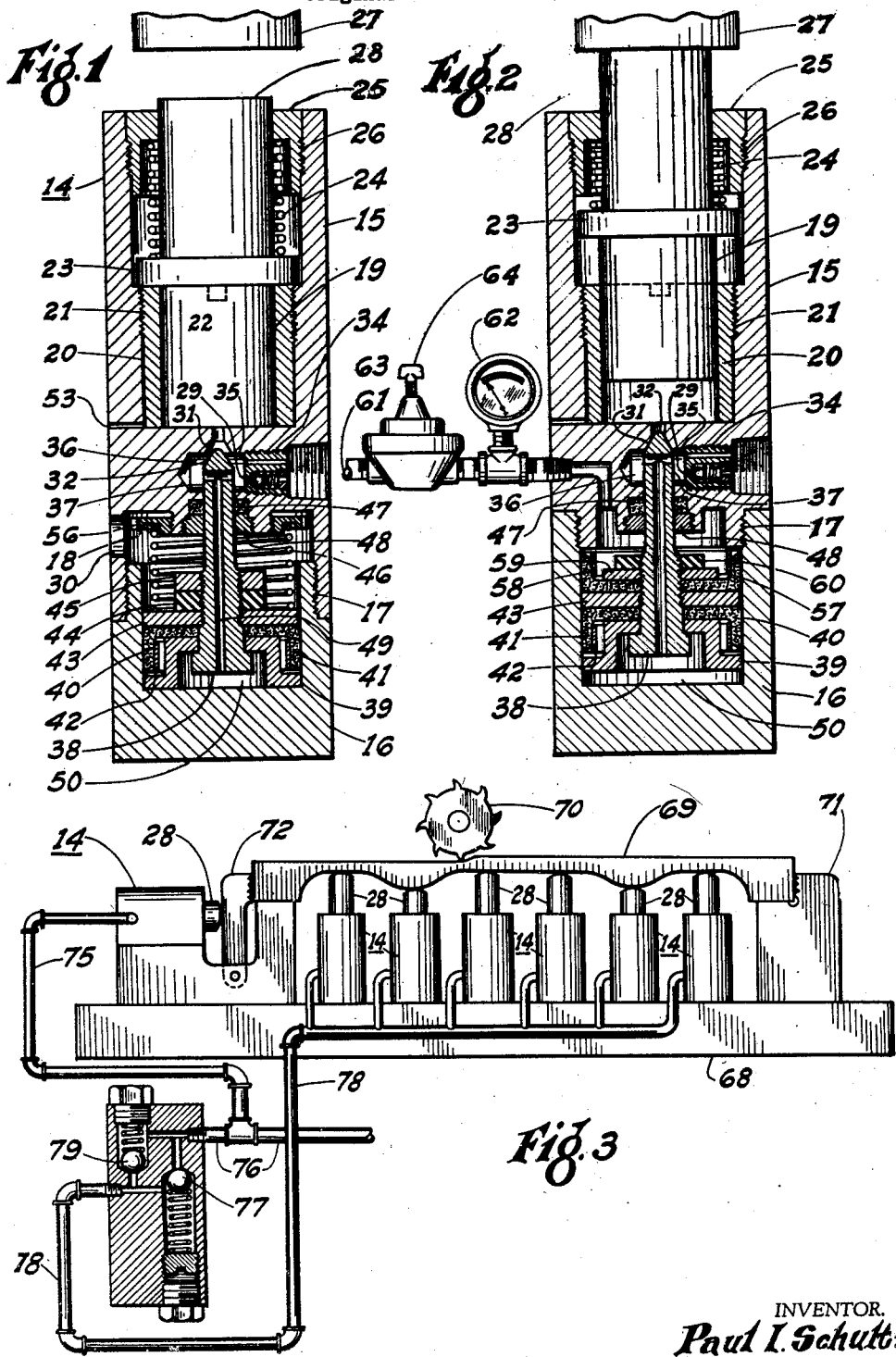
INVENTOR.
Paul I. Schultz
BY Woodling and Krost
ATTORNEYS Jan. 4, 1944. P. I. SCHULTZ 2,338,603
PRESSURE SUPPORTING MECHANISM
Original Filed Dec. 4, 1937 2 Sheets-Sheet 2

INVENTOR.
Paul I. Schultz
BY
Hoodling and Krost
ATTORNEYS

Patented Jan. 4, 1944

2,338,603

UNITED STATES PATENT OFFICE

2,338,603
PRESSURE SUPPORTING MECHANISM
Paul I. Schultz, Cleveland, Ohio Original application December 4, 1937, Serial No. 178,080. Divided and this application December 26, 1940, Serial No. 371,675

8 Claims. (Cl. 90—59)

My invention relates to fluid devices and more particularly to extendible fluid devices, and is a division of my application, Serial No. 178,080, filed December 4, 1937, for Fluid devices.

An object of my invention is the provision of an extendible fluid pressure device having two relatively movable parts forming an extendible fluid chamber and being arranged to move extendibly relative to each other for exerting an outward force as fluid pressure is supplied to said fluid chamber.

Another object of my invention is the provision of a fluid actuated work supporting device for supporting parts while being machined or otherwise worked on.

Another object of my invention is the provision of a fluid actuated work supporting device for supporting parts while being machined or otherwise worked on and which will automatically compensate for irregularities of the supported surface.

Another object of my invention is the provision of a fluid actuated device for backing up a work piece while being machined in order to prevent the work piece from springing away from the cutting tool.

Another object of my invention is the provision of a fluid actuated support or clamping device which extends automatically when fluid pressure is applied but which locks in a rigid fixed position upon contact with the part to be supported or clamped.

Another object of my invention is the provision of a fluid actuated support or clamping device which extends automatically when fluid pressure is applied but which locks in a rigid fixed position when any definite back pressure is built up due to contact of the support or clamping device with the part to be supported or clamped.

Another object of my invention is the provision of an extendible fluid actuated support or clamping device which will lock in a rigid fixed position after first contacting and then exerting a definite force against the part to be supported or clamped.

Another object of my invention is to provide a multiplicity of supporting or clamping devices all of which can be actuated by the same fluid source and which will function individually or in groups in any or all of the above ways.

Another object of my invention is the provision of an extendible fluid device which when once extended to engage an object will follow the object as it is moved away until the limit of the extension is reached.

Another object of my invention is the provision of an extendible fluid device having a pressure actuated valve for controlling the extendibility of the device.

Another object of my invention is the provision of an extendible fluid device having a pressure actuated valve in which the valve is biased to its closed position with a hydrostatic force.

Another object of my invention is the provision of an extendible fluid device having a pressure actuated valve and restricting means located between the valve and the fluid source to delay the build-up of the pressure of the fluid acting upon the valve and thereby permitting the valve to close before the value of the fluid acting on the valve reaches a value substantially equal to the pressure of the fluid source.

Other objects and a fuller understanding may be had by referring to the following description and claims taken in conjunction with the accompanying drawings, in which like parts are designated by like reference characters, and in which:

Figure 1 shows a cross-sectional view of an extendible fluid device embodying the features of my invention;

Figure 2 is a modified form of the invention shown in Figure 1;

Figure 3 is a diagrammatic illustration showing the manner in which my extendible fluid devices may be utilized in connection with a machine tool operation;

Figure 4:
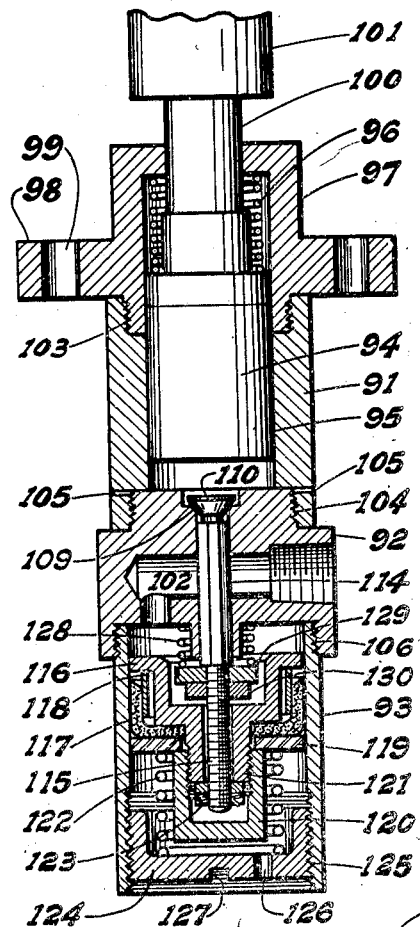
Figure 4 is a cross-sectional view of another form of my extendible fluid device.

With reference to Figure 1 of the drawings, my extendible fluid device is indicated generally by the reference character 14 and comprises an upper casing 15 and a lower casing 16 threadably connected together by the threads 17. The upper casing 15 is hollow and is provided with a fluid operated plunger 19 which engages a slidable support or lift member 28 which is arranged to engage an object 27. The lower end of the slidable support or lift member 28 is provided with an annular flange or shoulder 23 which rests upon the upper end of the cylinder 20. Therefore, relative movement may occur between the shoulder 23 and the plunger 19 and relieve the plunger 19 from side thrust incidental to the slidable support or lift member 28, which may as a modification be part of a machine or mechanism. The fluid operated plunger 19 is arranged to fit within a cylinder 20 which is threadably secured to the inside of the upper casing 15 by means of the threads 21. A suitable tool adapted to fit into the recess 22 provided on the upper end of the cylinder 20 may be used to screw the cylinder into the inside of the upper casing 15. In order to prevent the fluid from flowing past the plunger 19, there should be a good fit between the plunger 19 and the cylinder 20, or, any conventional seal may be employed.

A spring 24 is positioned between the shoulder 23 and a retaining cap 25 which is threadably connected to the inside of the upper casing 15 by means of the threads 26. The function of the spring 24 is to bias the fluid operated plunger 19 to its lowermost position when the fluid pressure is released. The fluid communication to the cylinder 20 is controlled by a valve having a valve seat 31 and a valve head 32. A restriction member 34, having a small opening 35, is positioned in the fluid port 36 and restricts the flow of the fluid into my fluid device. As illustrated, the restriction member 34 may be threadably engaged into the port 36 by the illustrated threads and is provided with a ball check valve 29 which allows the unrestricted flow of the fluid from my device.

The valve head 32 may be actuated by a valve stem 37 which is connected to and operated by a fluid piston 39 reciprocally mounted within a cylinder 40 provided in the lower casing 16. The piston 39 abuts against a shoulder 38 provided on the lower end of the valve stem 37 and includes a piston gasket 41, a spring expander 42 and a retaining plate 43 which is securely held in position by means of a jam nut 44 and a lock nut 45 which threadably engage the valve stem 37.

To prevent fluid from leaking past the upper end of the valve stem 37 and into the space above the piston 39, a gasket seal 47 snugly engages the valve stem 37 and is held in position by means of a threaded gasket cap 48. The fluid piston 39 is biased to its lowermost position by means of a spring 46 which is positioned between the retaining plate 43 and an adjusting nut 18. The tension of the spring 46 may be adjusted by turning the adjusting nut 18 by means of a suitable tool inserted through an opening 30 in the side of the casing 15 and engaging suitable peripheral notches 56 of the adjusting nut. The fluid in the port 36 surrounding the upper end of the valve stem 37 may flow through a fluid duct 49 which extends through the valve stem 37 and into the space 50 below the fluid piston 39. The space above the fluid piston 39 is open to atmosphere through means of the opening 30, so that the fluid piston may move up and down without entrapping air above it.

To operate my extensible fluid device shown in Figure 1, it is first connected to a fluid source and filled with a fluid. In cases where the objects to be supported are to be absolutely rigid, the fluid device must be filled with an incompressible fluid and no air bubbles must be allowed to form in the air passage or the cylinder chamber 20 between the fluid operated plunger 19 and the valve seat 31. To facilitate the removal of the air when filling my fluid device, a port 53 is provided in one side of the casing 15, which allows the air to escape when the cylinder 20 is unscrewed slightly. When oil or fluid is forced into the cylinder 20 below the plunger 19, it will start to flow out of the port 53, forcing the air in advance of it. The cylinder 20 is then screwed in tightly by means of a tool fitting in the recess 22, after which the slidable support or lift member 28, the spring 24 and the retainer cap 25 may be mounted. To avoid the possibility of air entering in the cylinder chamber 20 at any subsequent time, it may be advisable to place air traps in the fluid system.

In operation, the fluid is forced under pressure against the restriction member 34. The fluid flows comparatively slowly through the small opening 35 of the restriction member 34 and since the valve head 32 is biased away from the valve seat by means of the spring 46, a pressure will gradually build up in all of the fluid passages and chambers of my fluid device. As soon as the force created by the fluid pressure on the bottom of the fluid operated plunger 19 becomes great enough to overcome the spring 24, the fluid operated plunger 19 will move out of the cylinder 20 until the upper engaging end of the slidable support or lift member 28 meets with resistance or otherwise engages the object 27 which is to be supported. The ratios of the diameters of the plunger 19 and the piston 39 and the forces exerted by the springs 24 and 46 are so proportioned or adjusted that a greater fluid pressure is required to raise the piston 39 and close the valve head 32 against the valve seat 31 than is required to raise the plunger 19. The function of the spring 24 is to return the plunger 19 to its lowermost position.

In place of the spring 24, the weight of the piston or when applicable, the weight of the object being supported may be used in some cases to return the plunger 19 to its lowermost position. Or the piston may be returned manually by hand of by fluid means which may create a pressure on the outer end of the plunger or by withdrawing the fluid and creating a vacuum on the inner end of the plunger 19. As the fluid is forced into the port 36, it will continue to flow into the cylinder 20, under the plunger 19, until the plunger meets with resistance from some object which it is to operate and when sufficient resistance is encountered a pressure will be built up in the chamber 50 below the piston 39 sufficient to overcome the predetermined load of spring 46 at which point the valve head 32 will move upwardly and engage the valve seat 31 and entrap the fluid in the cylinder 20 below the plunger 19.

All of the passages should be so proportioned that the pressure in chamber 50 under piston 39 will remain substantially the same as the pressure in cylinder 20 under piston 19 at all times prior to the closing of valve head 32 against valve seat 31. The restriction member 34 may be employed to facilitate this, however, the restriction is not essential to the operation, especially if the velocity of the flow of the fluid source is not too high.

The value of the opposing force of the spring 46 may be varied by turning the adjusting nut 18, and the value of the force of the spring 46 may be so adjusted that the valve head 32 is hydrostatically biased to its closed position against the valve seat 31 before the pressure in the chamber 50 below the piston 39 becomes equal to the pressure of the fluid source or reaches a value substantially equal to the pressure of the fluid in the fluid feed pipe 33. Thus for example, if the pressure of the fluid entering my fluid device were 200 pounds per square inch, then the spring 46 may be so set that the valve head 32 is biased against the valve seat 31 when the pressure in the chamber 50 and in the cylinder 20 below the fluid actuated plunger 19 reaches 100 pounds per square inch. Consequently, after the closing of the valve head 32 against the valve seat 31, the pressure in the chamber 50 will build up to a pressure substantially equal to the pressure of the source and holds the valve head against the valve seat 31 with a hydrostatic force greater than that required to close the valve head 32 against the valve seat 31 and thereby enables the fluid operated plunger 19 to be subjected to an inward force which is greater than the outward force which the fluid operated plunger 19 exerted prior to the closing of the valve head 32 against the valve seat 31.

After the valve head 32 contacts the valve seat 31 the fluid operated plunger 19 can be subjected to a greater inward force than the outward force which the fluid operated plunger 19 exerted prior to the closing of the valve head 32 against the valve seat 31. In extending, the plunger 19 can only exert a force caused by the action of the fluid pressure acting on the bottom or effective area of plunger 19 and this pressure is equal to and can never exceed the pressure required to close the valve head 31 against the valve seat 32 or specifically the pressure required to overcome the tension of the spring 46 when acting on the effective area of the bottom of piston 39. The plunger 19, however, is capable of resisting a much higher inward force because to move the piston 19 back, it is necessary for the fluid pressure in cylinder 20 under fluid piston 19 to push the valve head 31 away from valve seat 32, so that fluid can flow out of cylinder 20. The force required to push the plunger 19 inwardly must be such that the force caused by the fluid pressure built up in the cylinder 20 acting on the valve head 32 plus the force exerted by the spring 46 is equal or greater than the force caused by the fluid pressure acting upon the piston 39. Since the effective area of the valve head 31 is small compared to the area of the plunger 19 and the piston 39, the force required to push the plunger 19 inwardly is considerably greater than the outward force exerted by the plunger 19 before the valve head 32 closes against the valve seat 31. A purpose of the restriction member 34 is to delay the build-up of the pressure of the fluid on the valve side of the restriction member and to permit the valve head 32 to close against the valve seat 31 before the value of the fluid pressure on the valve side of the restriction member becomes equal to or reaches a value substantially equal to the pressure of the fluid on the source side of the fluid restricting member 34. The restriction member 34 is not essential to the operation of the unit if the velocity of flow of the fluid source is not too high.

The pressure of the fluid is entrapped in the cylinder 20 below the fluid operated plunger 19 and tends to bias the valve head 32 away from the valve seat 31 and should this pressure ever become great enough so that the force which it creates on the valve head 32 plus the force of the spring 46 exceed the force exerted by the fluid pressure underneath the piston 39, then the valve head 32 will move away from the valve seat 31 and allow fluid to flow back into the source, which in turn, permits the fluid operated plunger 19 to move back. My invention is, therefore, useful and finds many advantages in cases where it is desired to have the fluid operated plunger move until it makes contact with the object it is to support, and after making contact will exert a definite maximum predetermined force within the limits of the movement of the plunger 19 regardless of the location of the object to be supported until the valve head 32 closes against the valve seat 31 after which the fluid operated plunger 19 may be subjected to a greater inward force than that exerted by the plunger 19 outwardly prior to the closing of the valve head 32 against the valve seat 31. When employing an incompressible fluid, the plunger 19 will move out until it makes contact with the object to be supported and will exert a definite predetermined force upon the object to be supported and when the object to be supported is stabilized in a fixed position, the plunger 19 will never move out any further, even though the object to be supported is entirely removed. This, of course, is advantageous in applications where it is desired to have a support in a definite position and where it would not be desirable to have the support or plunger follow the object it is supporting should the object be removed.

In Figure 2, I show a modification of a device shown in Figure 1, in that the fluid piston 39 is opposed by air or fluid pressure from the air or fluid supply line 61 which may be regulated by an air or fluid pressure regulator 63 by turning the hand adjustment 64. An air or fluid gauge 62 may be provided to indicate the value of the pressure opposing the fluid piston 39. The upper side of the fluid piston 39 is provided with a piston gasket 57 which is held in position by a gasket plate 59 and a nut 60 which threadably engages the valve stem 37. A spring expander 58 may be employed to force the piston gasket 57 outwardly against the inside wall of the cylinder 40. The operation of the fluid device shown in Figure 2 is substantially the same as that previously described for Figure 1, except that the value of the opposing force acting upon the fluid piston 39 may be regulated by the air or fluid pressure controlled by the adjustment 64.

In some applications it may be advantageous to regulate or vary the fluid pressure opposing the piston 39 automatically in connection with an operation being performed relative to the piece acted on by piston 19. For example, a work piece being machined may be supported by a number of units of the type indicated in Figure 1 or 2, and in the course of machining, a part of the work piece which is contacted by a support is cut off or otherwise moved and it is desired to have this particular support only to move out and contact a more remote part of the work piece. This can be accomplished by increasing the fluid pressure opposing the piston 39 to a value sufficient to cause the piston 39 to move the valve head 32 away from the valve seat 31, which allows fluid to flow into the cylinder 20 under the piston 19 causing the piston 19 to move out. By again dropping the fluid pressure opposing the piston 39 below the fluid pressure in chamber 50, the piston 39 will move and close the valve head 32 against the valve seat 31 and the unit will again act in its normal fashion.

It is, therefore, possible in the manner just explained to cause one or more units, which are connected to the same fluid source, to extend or to exert more or less force than they did at the instant valve 31 first closed, depending on the pressure of the fluid source by increasing the pressure opposing the piston 39 to a point where it is sufficient to cause the piston 39 to move the valve head 32 away from the valve seat 31, allowing fluid to flow into the cylinder 20 under the piston 19.

In Figure 3, I have illustrated the application of my fluid devices to a milling machine having a work table 68 and a cutter tool 70 arranged to cut the top surface of the work piece 69 held between the stationary jaw 71 and a movable jaw 72. As illustrated, a plurality of my fluid devices may be positioned upon the work table and arranged to have the outer end 28 of the plunger 19 to engage the underneath side of the irregular piece which is to be worked. A fluid device may be also used to operate the movable jaw 72. In this illustration the fluid devices may be controlled by a fluid valve 51 having a control handle 52 which regulates the flow of fluid from the feed pipe 33. In the illustrated arrangement, the fluid device for actuating the movable jaw 72 is arranged to exert a force and hold the work piece 69 in position prior to the operation of the fluid devices positioned under the work piece 69. The delayed action of the devices under the work piece 69 is accomplished by the employment of an adjustable spring loaded one-way valve 77 which must be biased open before fluid is permitted to flow through the fluid pipe 76 and the fluid pipe 78 which leads to the fluid devices positioned under the work piece 69. Thus, as soon as the control lever 52 of the supply valve 51 is open, the fluid is immediately allowed to flow from the fluid feed pipe 33 through the pipe 75 and into the fluid device which operates the movable jaw 72. When releasing the pressure upon the fluid devices, the control lever 52 of the supply valve 51 is moved to its released position, in which case fluid from the device 14 operating the movable jaw 72 flows directly through the pipe 75, and to the fluid return pipe 74, and the fluid from the devices positioned under the work piece 69 flows through the pipe 78, the ball check valve 79 and the pipe 76 to the fluid return pipe 74.

The work piece 69 may then be removed and a new work piece inserted in the jaw 71 and jaw 72, after which the operation may again be repeated. In operation, the upper end of the fluid operated plunger 19 exerts a definite predetermined pressure upon the underneath side of the work piece 69 until the valve head 32 engages the valve seat 31, and entraps the fluid in the cylinder 20 which then acts as a solid body of inert fluid and which holds the work piece 69 in a fixed position without exerting an outward force as the tool cutter 70 is operated. In the event that the work piece 69 tends to bow-up as a result of the weakening of the work piece after it is cut, the plungers will not follow the work piece 69 but will remain fixed so that an accurate milling job may be obtained. In the event that the cutter tool 70 strikes an extraordinary hard place and consequently exerts heavy pressure which exceeds the force required to bias the valve head 32 away from the valve seat 31, then the work piece 69 may be allowed to go down and permit the tool to pass over without damaging the expensive cutter tool 70. But for the regular cutting, the opposing force of the spring 46 or the air or fluid acting downwardly upon the piston 39 is so adjusted that the plunger will adequately support the work piece 69 without its going down.

The locating supports upon which the ends of the work piece 69 rests may be fluid units of my design, having their plungers fully extended or engaging permanent stops. These would allow the work piece 69 to move down without damaging it if an excessive overload occurred as explained above. The supporting members or devices 14 may be made to function in any order by means of valves as 77 or by changing amount of resistance on plunger 19, as by varying spring 24.

In any case where it is desirable to have the individual supports exert a predetermined force, but where the total force of all the supports would be too great or undesirable as in supporting a long work piece as illustrated by 69 (see Fig. 3) or in supporting any part which would have a tendency to bend, it is advantageous to have the supports operate consecutively singly, or consecutively in groups. Since the supports act as a solid unit, and do not exert an outward force after the valve 32 is closed, it is possible to prevent the supported piece from being subjected to the total force exerted by all the support units and it is possible to reduce the force exerted on the supported piece at any one time to the value of the force exerted by each individual support acting in consecutive order.

In Figure 4, I show another modification of my fluid device, and the principal distinction resides in the action of the valve for entrapping the fluid beneath the fluid actuated plunger. As illustrated, the invention in Figure 4 comprises an upper casing 91, an intermediate casing 92 and a lower casing 93. The upper casing 91 is threadably connected to the intermediate casing 92 by means of the threads 104 and the lower casing 93 is threadably connected to the intermediate casing 92 by the threads 106. A fluid operated plunger 94 is positioned within a cylinder 95 of the upper casing 91 and is arranged to be biased downwardly by means of an outward plunger 100 and a spring 96 which is retained in position by means of a retaining cap 97 which is threadably connected to the upper casing 91 by means of the threads 103. The retaining cap 97 may be provided with ear flanges 98 having holes 99 through which fastening means may be inserted for mounting the fluid device to any suitable support. The outward plunger 100 rests upon the fluid operated plunger 94 and is designed to move outwardly and engage an object illustrated generally by the reference character 101.

The valve seat 109 is provided in the intermediate casing 92 and is arranged to be closed by a valve head 110 which is operated by means of a valve stem 114 which is actuated by means of a fluid piston 116 reciprocally mounted within the lower casing 93. The fluid piston 116 may comprise a piston gasket 117 retained in place by means of a piston plate 119 and a cupped cap 120 which is threadably secured to the lower end of the piston by means of the threads 121.

A spring expander 118 may be employed to force the piston gasket 117 outwardly against the inside wall of the cylinder formed in the lower casing 93. The lower end of the valve stem 114 is threaded as indicated by the reference character 115 and is provided with a nut 123 which is arranged to be engaged by the lower end of the fluid piston 116 when the fluid piston 116 is urged downwardly by the fluid pressure. The downward movement of the fluid piston 116 is opposed by a restraining spring 122 which is positioned between the lower end of the fluid piston 116 and a retaining cap 124 which is threadably connected to the inside of the lower casing 93 by means of the threads 125. The value of the restraining force of the spring 122 may be varied by turning the retaining cap 124 by using a suitable tool which may fit into the tool recess 127. An opening 126 may be provided within the retaining cap 124 to allow air to escape from the lowermost portion of the lower casing 93 when the fluid piston 116 is forced downwardly by the fluid pressure.

Figure 5:
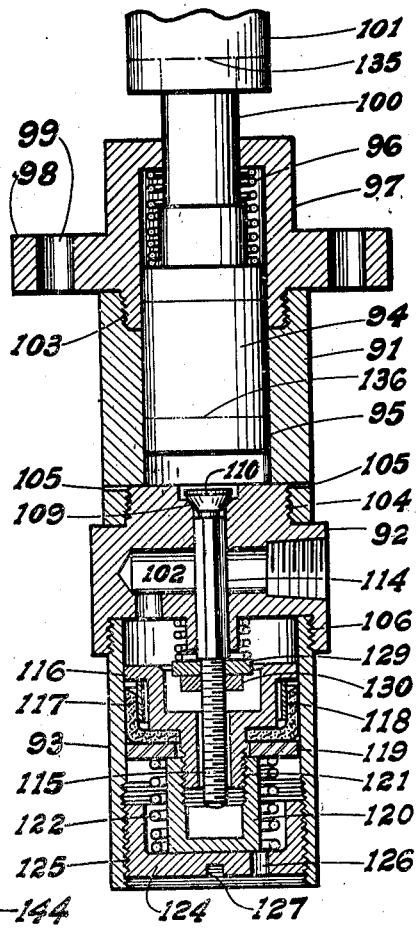
Figure 5 is a cross-sectional view of a device which is a modified form of the device shown in Figure 4.

In some applications for the use of my fluid device, the nut 123 may be removed as shown in Figure 5 and in these applications the spring 128 which acts downwardly upon the washer 129 may be employed to force the valve stem 114 downwardly to close the valve head 110 against the valve seat 109, whenever piston 116 is not in contact with nut 130. The spring 128 may be dispensed with when the unit is mounted in a vertical position as the weight of the valve stem will close the valve. The spring 128 may also be dispensed with in the showing indicated by Figure 4.

The washer 129 may be held in place by means of a nut 130 which threadably engages the threaded portion 115 of the valve stem 114. To operate the fluid device shown in Figure 4, it is first filled with a fluid from a fluid source. To facilitate the removal of air when filling my fluid device with fluid, the ports 105 in the casing are provided, which allow the air to escape when the upper casing 91 is unscrewed slightly from the intermediate casing 92. When oil or fluid is forced into the cylinder 95 below the plunger 94, it will start to flow out of the ports 105, forcing the air in advance of it. The upper casing 91 is then screwed in tight and my device is ready for operation.

In operation, fluid is forced under pressure into the port 102 and since the valve head 110 is biased away from the valve seat 109, the pressure will build up in all of the fluid passages and chambers. As soon as the force created by the fluid pressure on the bottom of the plunger 94 becomes great enough to overcome the spring 96, the plunger 94 will move upwardly and cause the outward plunger 100 to engage the object 101. The plunger 94 will continue to move until it meets with sufficient resistance at which point the fluid pressure in my device will build up sufficiently to cause the fluid piston 116 to move downwardly and engage the nut 123 to close the valve head 110 against the valve seat 109. The value of the fluid pressure required to force the fluid piston 116 downwardly may be varied by turning the retaining cap 124 and adjusting the force exerted by the spring 122. Therefore, the plunger 94 may be made to exert a predetermined pressure upon the object 101 before the valve head 110 engages the valve seat 109 which entraps the fluid in the cylinder 95 below the plunger 94. It is understood that this predetermined pressure may be made any value by changing the diameters of the plunger 95 and the piston 116 as well as changing the tension of the spring 122. In cases where it is desirable to prevent the possibility of valve 109 closing against seat 110, either before or after plunger 94 meets with resistance and causes the building up of the proper predetermined back pressure to move piston 116 and close valve 109 against seat 110, a restriction member as 34 described in connection with Figures 1 and 2 may be employed or if desired, this possibility may be prevented by correctly proportioning the passages leading between the fluid source and cylinder 95 under plunger 94 and between the fluid source and cylinder 93 above piston 116. This possibility will also be automatically prevented if the velocity of flow of the fluid source is not too high.

After the valve head 110 closes against the valve seat 109 the entrapped fluid under the plunger 94 may be subjected to unlimited pressure depending upon the facility of the fluid chamber to retain the fluid without leaking. In other words, it will be impossible to force the plunger 94 back into the cylinder 95 regardless of the force which might be exerted on it by the object 101. It is to be noted that with the device shown in Figure 4 when the object 101 is removed, the piston plunger 94 will not follow the object or move outwardly as long as the valve head 110 is biased against the valve seat 109.

To allow the plunger 94 to recede the valve head 110 is raised from the valve seat 109 by means of the piston 116 engaging the nut 130. The piston 116 may be caused to engage the nut 130 by reducing the pressure of the fluid source and permitting the spring 122 to bias the piston 116 upwardly. In other words, the fluid pressure acting downwardly upon the piston 116 must, in order that the valve head 110 may be raised from the valve seat 109, be less than the predetermined pressure required to move the piston 116 downwardly to close the valve head 110 against the valve seat 109. If any pressure exists in cylinder 95 it will be necessary to break the valve 110 open against this pressure. If the fluid pressure of the source is repeatedly reduced to a value below the predetermined value and then increased to a value above the predetermined value, the plunger 94 may be made to move intermittently outwardly upon each repeated cycle change in the fluid pressure.

In Figure 5, I show a modified arrangement of the device shown in Figure 4 in that the nut 123 is removed in which case the piston plunger 94 will follow the object 110 if it is moved outwardly. In other words, the downward movement of the fluid piston 116 does not move the valve stem 114 downwardly to close the valve head 110 against the valve seat 109, but the upward movement of the fluid piston 116 does move the valve stem 114 upwardly to lift the valve head 110 from the valve seat 109. Thus the plunger 94 moves outwardly so long as the pressure of the fluid source is sufficiently high to raise the load or object upon the plunger 94. If the load is removed, the plunger 94 will move outward and follow the object.

In other words, in this modification the downward motion of the piston 116 merely allows the valve head 110 to close against the valve seat 109, but does not force it down or hold it closed.

When the piston 116 is biased down, the valve 110 acts as a one way check valve which allows fluid to enter but prevents fluid from leaving the cylinder 95. The piston 116, however, functions to open and hold open the valve 110 whenever the piston 116 is biased upward against the nut 130 with a force sufficient to move the valve 110 away from the valve seat 109.

The modification shown in Fig. 4 can be made to function substantially the same as explained above in connection with the modification shown in Fig. 5 by the use of an independent one way check valve connected so that it will allow fluid from the source to flow into the cylinder 95 below the plunger 94 but will prevent fluid from flowing out of the cylinder 95.

The pressure on top of the valve head 110 has no tendency to close the valve head 110 against the valve seat 109 as long as the valve is open. After the valve is closed, however, any pressure on top of valve 110 would tend to hold the valve head 110 against the valve seat 109 and any pressure acting on the bottom would tend to force the valve head 110 off of the valve seat 109. These pressures are equal before the valve closes but may or may not be equal after the valve closes. By making the two diameters of the valve seat 109 (see Fig. 5) as close as possible when the piston 116 is not in contact with the nut 130, the valve 110 will open with only a small difference in pressure and fluid will flow from the chamber 102 into the cylinder 91 under the piston 94, when the pressure in the chamber 102 exceeds the pressure in the cylinder 91 under the piston 94, by only a negligible amount.

Dash and dot lines 135 and 136 are shown to indicate that the plunger 94 moves outwardly as the object 110 is elevated. The valve stem 114 is urged downwardly by the spring 128. When the fluid pressure builds up to a predetermined value as determined by the setting of the adjustable spring 122, the fluid piston 116 is forced downwardly and permits the spring 128 to close or bias the piston valve head 110 against the valve seat 109. The closing of the valve head 110 against the valve seat 109 entraps the fluid beneath the plunger 94 after which it may be subjected to unlimited load or force depending upon the ability of the fluid chamber to retain the fluid. To raise the valve head 110 from the valve seat 109 the fluid pressure acting downwardly upon the fluid piston 116 is decreased to a value such that the spring 122 urges the fluid piston 116 upwardly and raises the valve stem 114. When the valve head 110 is moved upwardly resulting from a reduced fluid pressure of the source, the entrapped fluid under the plunger 94 is free to escape and the plunger 94 may then recede. Whenever the force created by the fluid pressure under the piston 94 is less than the forces urging the piston 94 down, the lowering of the plunger 94 is obtained by lowering the pressure of the fluid source and the raising of the plunger against a heavy load is obtained by increasing the pressure of the fluid source. In lowering, however, the plunger 94 cannot recede until the pressure drops sufficiently to allow the piston 116 to open valve 110 while in raising the plunger can be biased upward by any pressure of the fluid source since the valve 110 offers no resistance in this direction.

Figure 6:
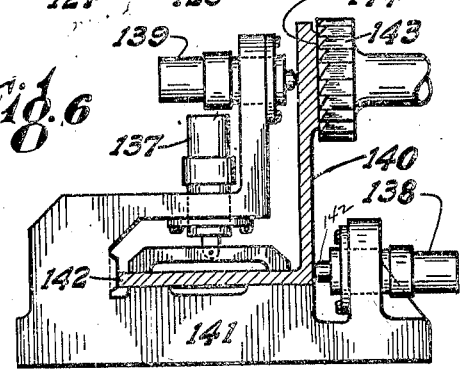
Figure 6 shows an arrangement for holding an object utilizing the devices shown in Figures 4 and 5.

In Figure 6 I show an arrangement utilizing the fluid device as shown in Figures 4 and 5. The fluid devices indicated generally by the reference character 137 and 138 are the same as that shown in Figure 5 and the fluid device indicated by the reference character 139 is the same as that shown in Figure 4. The reference character 140 represents an angle shape work piece which is held down to the support or fixture base 141 by the support 137 and is held longitudinally against the locating stop 142 by the support unit 138. These two support units 137 and 138 being of the type indicated by Figure 5, will always maintain an outward force and will solidly resist any reverse movement, accordingly, the angular work piece will be held rigidly against the base 141 and the locating stop 142. The reference character 143 represents a cutter which is machining the face 144 of the work piece 140. Because the work piece 140 has a comparatively weak vertical section, if it were not supported or backed up, it would be sprung away from the cutter 143. To prevent the work piece from springing away from the cutter 143, it is backed up by the support unit 139, which, as explained, is of the type indicated by Figure 4.

In clamping the work piece 140 into the fixture, the support 138 is caused to operate first, this forces the work piece 140 against the locating stop 142. Next, support 137 operates and forces work piece 140 down against fixture base 141. This locates and clamps the base of the work piece 140 securely to the fixture 141. The support 139 is then caused to move out and contact the upper end of the work piece 140 on the opposite side to the cutter 143. The support 139, being of the type as indicated by Figure 4, moves out until it contacts the work piece and is adjusted to exert only a slight force to provide sufficient resistance to cause the piston 116 to move and close the valve 110 on the valve seat 109. The support member 139 is now a rigid unit which backs up the upper end of the work piece 140 and prevents it from moving away from the cutter 143, but does not exert a force against the work piece 140 which would tend to bend it towards the cutter 143.

While I have shown the use of a cylinder and a plunger representing my invention, it is to be understood that the cylinder and plunger may be substituted by a diaphragm or a bellows, or any fluid actuated element, which may be expanded. The valve may also be operated by a diaphragm or bellows or any fluid actuated element. The fluid actuated valve and the fluid actuated members may be separate units connected by a duct. One fluid actuated valve can be used to control two or more fluid actuated members or plungers if it is desired to obtain compensating features between the fluid actuated devices. When more than one of my fluid devices are used in combination and even though they may be actuated by the same fluid source, the fluid actuated plungers may be made to operate in any order and they may be made to exert individually any desired force before the valves close and the valves can be made to operate in any order desired. All these functions may or may not be, as desired, independent of the pressure of the fluid source, provided the pressure of the fluid source is sufficient to operate the plunger embodied in my fluid devices.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, and means for automatically releasing the fluid in any cylinder when the back pressure of the fluid in the said any cylinder exceeds a predetermined value.

2. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, valve means responsive to the fluid in communication with each cylinder for preventing the forward flow of the fluid to each said cylinder when the work engaging means for each said cylinder exerts a predetermined pressure upon the work piece, said valve means including automatic means for preventing the reverse flow of the introduced fluid from each of the cylinders, said automatic means being inoperative to prevent said reverse flow when the pressure of fluid source is below the said predetermined pressure.

3. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, means responsive to the pressure exerted by the work engaging means of any cylinder upon the work piece to control the flow of fluid into and out of the said any work cylinder, and valve means to admit fluid to at least one of said cylinders prior to admitting fluid to the remaining cylinders.

4. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, and valve means responsive to the pressure exerted by the work engaging means of any cylinder upon the work piece to control the flow of fluid into and out of the said any work cylinder, said valve means after closing and entrapping the fluid in the cylinder of the said any work cylinder being governed for its opening movement by the pressure of the fluid source.

5. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, valve means responsive to the pressure exerted by the work engaging means of any cylinder upon the work piece to control the flow of fluid into and out of the said any work cylinder, said valve means after closing and entrapping the fluid in the cylinder of the said any work cylinder being governed for its opening movement by the pressure of the fluid source, and adjustable means for governing the value of the fluid pressure at which the valve in said any work cylinder opens and closes.

6. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, valve means responsive to the fluid in communication with each cylinder for preventing the forward flow of the fluid to each said cylinder when the work engaging means for each said cylinder exerts a predetermined pressure upon the work piece, said valve means including automatic means for preventing the reverse flow of the introduced fluid from each of the cylinders, said automatic means being inoperative to prevent said reverse flow when the pressure of fluid source is below the said predetermined pressure, and adjustable means for governing the value of the said predetermined pressure.

7. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work, piece, valve means responsive to the fluid in communication with each cylinder for preventing the forward flow of the fluid to each said cylinder when the work engaging means for each said cylinder exerts a predetermined pressure upon the work piece, said valve means after preventing said forward flow entrapping the fluid in each said cylinder and preventing the reverse flow thereof, said valve means being biased toward its open position by the entrapped fluid.

8. A pressure supporting mechanism of the character described for engaging a work piece comprising, in combination, a plurality of fluid pressure cylinders, a piston movable in each cylinder and having projecting work engaging means, means for jointly introducing fluid into the cylinders and causing the work engaging means to engage the work piece, valve means responsive to the fluid in communication with each cylinder for preventing the forward flow of the fluid to each said cylinder when the work engaging means for each said cylinder exerts a predetermined pressure upon the work piece, said valve means after preventing said forward flow entrapping the fluid in each said cylinder and preventing the reverse flow thereof, said valve means being biased toward its open position by the entrapped fluid, and means to automatically control the order in which the cylinders operate.

PAUL I. SCHULTZ.